United States Patent
Osawa

(10) Patent No.: US 8,096,376 B2
(45) Date of Patent: Jan. 17, 2012

(54) HYBRID VEHICLE

(75) Inventor: Koichi Osawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 453 days.

(21) Appl. No.: 12/312,544

(22) PCT Filed: May 23, 2008

(86) PCT No.: PCT/JP2008/059962
§ 371 (c)(1),
(2), (4) Date: May 15, 2009

(87) PCT Pub. No.: WO2008/146900
PCT Pub. Date: Dec. 4, 2008

(65) Prior Publication Data
US 2010/0038160 A1 Feb. 18, 2010

(30) Foreign Application Priority Data
May 30, 2007 (JP) ................................. 2007-143846

(51) Int. Cl.
*B60W 10/30* (2006.01)
(52) U.S. Cl. ............... 180/65.27; 180/65.21; 180/65.29
(58) Field of Classification Search .............. 180/65.21, 180/65.25, 65.29, 65.26, 65.27, 65.28, 65.285; 701/22, 201, 25, 26; 903/903, 907, 918
See application file for complete search history.

(56) References Cited

U.S. PATENT DOCUMENTS

| | | | | |
|---|---|---|---|---|
| 6,223,106 B1* | 4/2001 | Yano et al. | ...................... | 701/22 |
| 6,613,465 B2* | 9/2003 | Yamaoka et al. | ............. | 429/423 |
| 6,721,637 B2* | 4/2004 | Abe et al. | ........................ | 701/22 |
| 6,814,170 B2* | 11/2004 | Abe et al. | ................... | 180/65.25 |
| 7,316,219 B2* | 1/2008 | Yamaguchi et al. | .......... | 123/431 |
| 7,740,092 B2* | 6/2010 | Bender | ...................... | 180/65.29 |
| 7,847,495 B2* | 12/2010 | Oyobe et al. | .................. | 318/53 |
| 7,872,443 B2* | 1/2011 | Ward | ............................ | 903/907 |
| 2006/0113129 A1* | 6/2006 | Tabata | ......................... | 180/65.2 |
| 2006/0250902 A1* | 11/2006 | Bender et al. | ..................... | 369/1 |
| 2009/0277702 A1* | 11/2009 | Kanada et al. | ............. | 180/65.29 |

FOREIGN PATENT DOCUMENTS

| | | |
|---|---|---|
| JP | A-2002-070680 | 3/2002 |
| JP | A-2002-295347 | 10/2002 |
| JP | A-2004-324440 | 11/2004 |
| JP | A-2005-214122 | 8/2005 |
| JP | A-2005-226462 | 8/2005 |
| JP | A-2007-168512 | 7/2007 |

* cited by examiner

*Primary Examiner* — Hau Phan
(74) *Attorney, Agent, or Firm* — Oliff & Berridge, PLC

(57) ABSTRACT

A hybrid vehicle includes a fuel tank holding fuel for an engine, a pump discharging the fuel in the fuel tank, a pipe for returning the fuel discharged by the pump to the fuel tank and a control device (hybrid control unit). The control device starts the pump to circulate the fuel (FL) when the stop period of the pump is at least a predetermined period.

3 Claims, 4 Drawing Sheets

HYBRID VEHICLE

TECHNICAL FIELD

The present invention relates to a hybrid vehicle.

BACKGROUND ART

Hybrid vehicles have recently been attracting much attention as environmentally friendly vehicles. The hybrid vehicles are vehicles that run employing, as power supplies, a power storage device (battery), an inverter and an electric motor (motor) driven by the inverter, in addition to a conventional engine.

Even though the engine is started at regular time intervals, such vehicles may hardly consume fuel in a fuel tank over a long period of time because of the short driving time. In this case, fuel degradation or alteration may result in deteriorated starting capability of engine and deteriorated emission characteristics.

Japanese Patent Laying-Open No. 2005-226462 discloses a fuel supply apparatus in which a fuel pump and path switching means are provided integrally. This fuel supply apparatus is configured to be switchable between an operating state of supplying fuel in the fuel tank to a carburetor and a circulating state of returning fuel in the carburetor back to the fuel tank. When the engine is to be stopped over a long period of time, the fuel supply apparatus is controlled to be in the circulating state. This can solve inconveniences such as starting failure due to fuel degradation or alteration next time the engine is started.

When the stop period of the engine mounted on a hybrid vehicle is long, rust may be formed in pipes, for example, due to moisture separated from the fuel remaining in the pipes. Further, progress in degradation of fuel remaining in the pipes may affect the engine operation.

Conceivable as a method for preventing such problems is the method disclosed in Japanese Patent Laying-Open No. 2005-226462, i.e., the method for returning all fuel in the pipes to the fuel tank. According to this method, however, fuel is not remaining in the pipes when the traveling mode of the hybrid vehicle is set at a mode in which the engine is allowed to operate, which creates difficulty in supplying fuel to the engine immediately after starting the fuel pump. Accordingly, the engine cannot be started immediately, which may affect traveling of the hybrid vehicle.

DISCLOSURE OF THE INVENTION

An object of the present invention is to provide a hybrid vehicle that allows reduction in influences exerted by fuel upon the vehicle when the engine has been stopped for a long period of time.

In summary, the present invention is directed to a hybrid vehicle including a power storage device, a connection unit configured to electrically connect the power storage device and an external power supply present external to the hybrid vehicle such that the power storage device is charged by the external power supply, a rotating electric machine generating a torque for driving a wheel by electric power received from the power storage device, an internal combustion engine executing at least one of driving of the wheel and supplying of motive power to the rotating electric machine, a fuel tank holding fuel for the internal combustion engine, a fuel pump discharging the fuel in the fuel tank, a return pipe for returning the fuel discharged by the fuel pump to the fuel tank, and a control device driving the fuel pump to circulate the fuel in the fuel tank through the return pipe, when the fuel pump has been stopped for at least a predetermined period and the power storage device is being charged by the external power supply.

Preferably, the fuel pump is configured to be operated by electric power received from the external power supply via the power storage device.

Preferably, the control device sets an operating mode of the hybrid vehicle at one of a first mode of operating at least the internal combustion engine and a second mode of stopping the internal combustion engine and operating the rotating electric machine. The control device measures a traveling time of the hybrid vehicle in the second mode as a stop period of the fuel pump to determine whether or not the fuel pump has been stopped for at least the predetermined period.

Therefore, the present invention allows reduction in influences exerted by fuel upon the vehicle in the case where the stop period of the fuel pump for supplying fuel to the engine mounted on the hybrid vehicle extends over a long period of time.

BEST MODES FOR CARRYING OUT THE INVENTION

Figure 1:
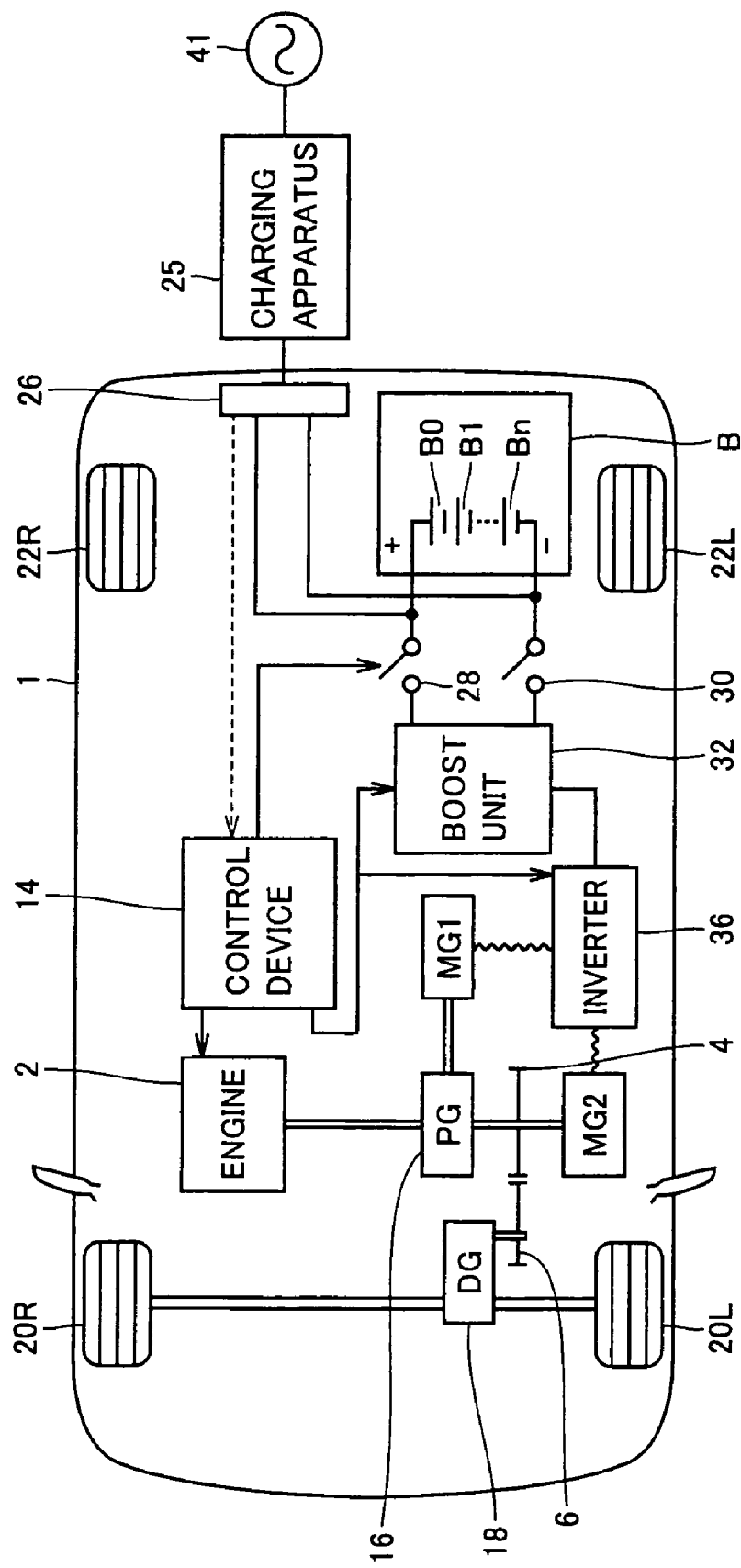
FIG. 1 shows a main structure of a hybrid vehicle 1 according to a present embodiment.

In the following description, embodiments of the present invention will be described in more detail with reference to the drawings. Like or corresponding parts in the drawings will be denoted by like reference numerals and description thereof will not be repeated.

FIG. 1 shows a main structure of hybrid vehicle 1 according to the present embodiment. As will be described below, hybrid vehicle 1 is provided with an engine and a motor as power supplies.

Referring to FIG. 1, hybrid vehicle 1 includes front wheels 20R and 20L, rear wheels 22R and 22L, engine 2, a planetary gear 16, a differential gear 18, and gears 4 and 6.

Hybrid vehicle 1 further includes a battery B, a boost unit 32 boosting a direct-current power received from battery B, an inverter 36 transmitting and receiving direct-current power to and from boost unit 32, a motor generator MG1 coupled to engine 2 via planetary gear 16 mainly for generating power, and a motor generator MG2 having a rotation shaft connected to planetary gear 16. Inverter 36 is connected to motor generators MG1 and MG2 for converting between alternating-current power and direct-current power received from boost unit 32.

Planetary gear 16 has first to third rotation shafts. The first rotation shaft is connected to engine 2, the second rotation shaft is connected to motor generator MG1, and the third rotation shaft is connected to motor generator MG2.

Attached to this third rotation shaft is gear 4. This gear 4 drives gear 6 for transmitting motive power to differential gear 18. Differential gear 18 transmits the motive power received from gear 6 to front wheels 20R and 20L, as well as transmitting rotative force of front wheels 20R and 20L to the third rotation shaft of planetary gear via gears 6 and 4.

Planetary gear 16 serves to split motive power among engine 2, motor generators MG1 and MG2. Specifically, when rotation of two of the three rotation shafts of planetary gear 16 is determined, rotation of the other one of the rotation shafts is inevitably determined. Accordingly, the vehicle speed is controlled by controlling the amount of power generated by motor generator MG1 to drive motor generator MG2 while operating engine 2 in the most efficient range, so that a totally energy-efficient vehicle is achieved.

A reduction gear may be provided which reduces the rotation of motor generator MG2 for transmission to planetary gear 16. A transmission gear may be provided which can change the reduction ratio of that reduction gear.

Battery B as a power storage device, including, for example, a nickel-metal hydride or lithium ion secondary battery, supplies direct-current power to boost unit 32, as well as being charged by direct-current power received from boost unit 32. The power storage device mounted on hybrid vehicle 1 may be an electric double layer capacitor, for example.

Boost unit 32 boosts a direct-current voltage received from battery B to supply the boosted direct-current voltage to inverter 36. Inverter 36 converts the received direct-current voltage into an alternating-current voltage to drive motor generator MG1 at the start of engine. After the start of engine, alternating-current power generated by motor generator MG1 is converted by inverter 36 into direct current and converted by boost unit 32 into a voltage suitable for charging battery B, so that battery B is charged.

Inverter 36 also drives motor generator MG2. Motor generator MG2 assists engine 2 in driving front wheels 20R and 20L. In a braking mode, the motor generator performs a regenerative operation to convert rotation energy of the wheels into electric energy. The obtained electric energy is returned to battery B via inverter 36 and boost unit 32. Battery B is a battery pack, including a plurality of battery units B0 to Bn connected in series. Provided between boost unit 32 and battery B are system main relays 28 and 30 for interrupting a high voltage when the vehicle is not traveling.

Hybrid vehicle 1 further includes a connector 26. Connector 26 is connected to a charging apparatus 25 located external to hybrid vehicle 1. Charging apparatus 25 converts an alternating-current voltage (e.g., AC 100V) received from an alternating-current power supply 41 into a direct-current voltage suitable for charging battery B. The direct-current voltage is supplied to battery B via connector 26 and an electric power line within hybrid vehicle 1 connected to connector 26. Battery B is thereby charged. In other words, connector 26 is a connection part configured to electrically connect battery B and an external power supply (alternating-current power supply 41 and charging apparatus 25) present external to hybrid vehicle 1 such that battery B is charged by the external power supply.

Hybrid vehicle 1 further includes control device 14. Control device 14 controls engine 2, inverter 36, boost unit 32, and system main relays 28 and 30 according to driver's instructions and outputs from various types of sensors mounted on the vehicle.

As shown in FIG. 1, hybrid vehicle 1 is configured to be rechargeable from an external power supply. Specifically, hybrid vehicle 1 includes battery B for supplying electric power to motor generators MG1 and MG2 as well as connector 26 for charging battery B from a power supply external to the vehicle. Control device 14 determines that charging of battery B has been started when charging apparatus 25 and connector 26 are connected to each other.

Figure 2:
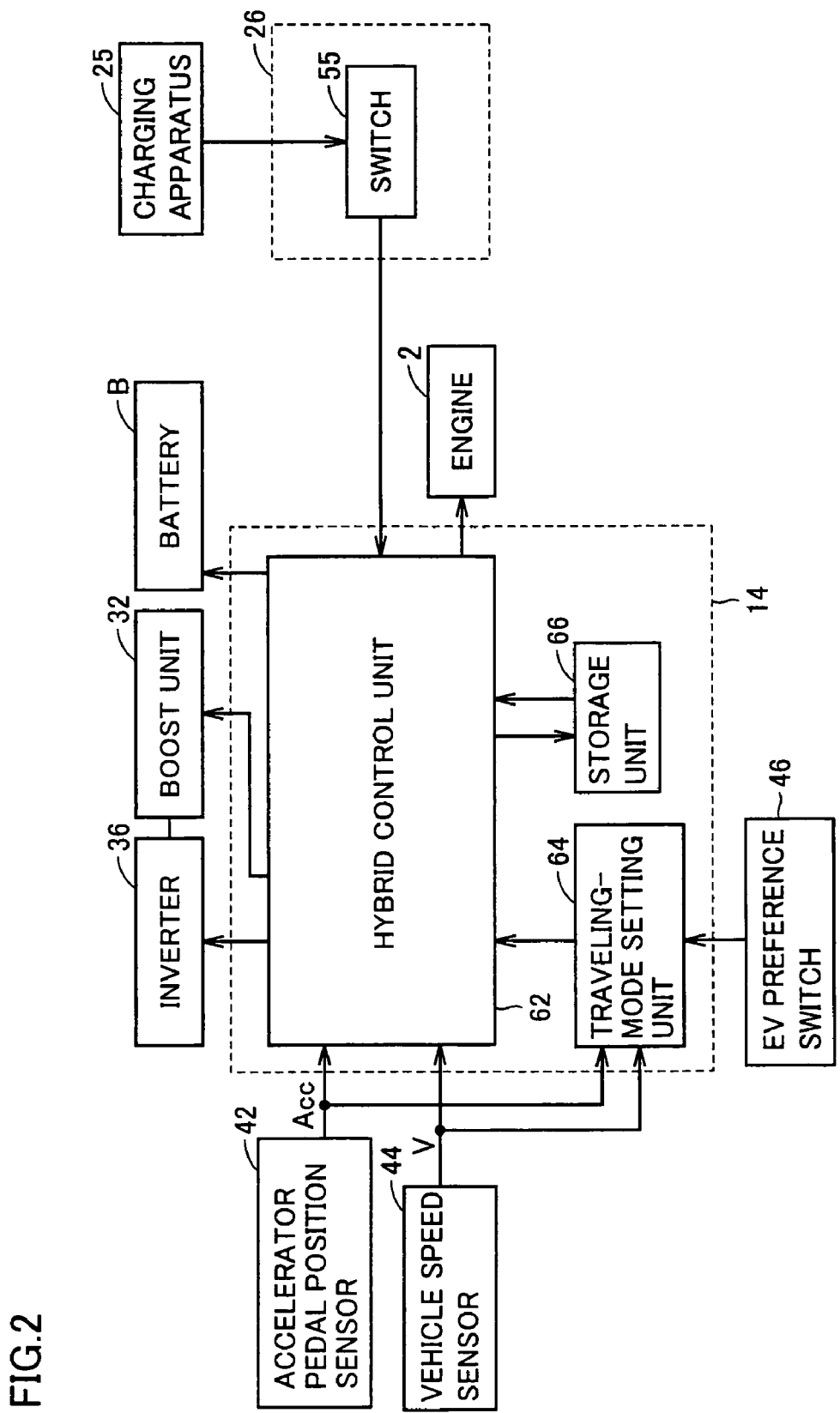
FIG. 2 is a functional block diagram showing a control device 14 of FIG. 1 and peripherals associated with control device 14.

FIG. 2 is a functional block diagram showing control device 14 of FIG. 1 and peripherals associated with control device 14. Control device 14 may be implemented either by hardware or software.

Referring to FIG. 2, control device 14 includes a hybrid control unit 62, a traveling-mode setting unit 64 and a storage unit 66. Hybrid control unit 62 obtains the state of charge (SOC) of battery B for example by summing charging and discharging currents of battery B. Hybrid control unit 62 controls the throttle of engine 2 as well as detecting the engine speed of engine 2.

Hybrid control unit 62 calculates power requested by the driver (requested power) based on an output signal Acc from an accelerator pedal position sensor 42 and a vehicle speed V detected by a vehicle speed sensor. In addition to this driver's requested power, hybrid control unit 62 calculates the necessary driving power (total power) in consideration of the state of charge SOC of battery B, to further calculate the speed requested of engine and power requested of engine. Hybrid control unit 62 controls the throttle of engine 2 based on the requested speed and requested power.

Hybrid control unit 62 calculates a driver's requested torque according to the traveling state of the vehicle to cause inverter 36 to drive motor generator MG2, as well as causing motor generator MG1 to generate power if necessary.

The driving force of engine 2 is distributed for directly driving the wheels and for driving motor generator MG1. The sum of driving force of motor generator MG2 and force directly driven by engine is the driving force of vehicle. In other words, according to the present embodiment, engine 2 drives not only the vehicle but also motor generator MG1 to supply motive power to motor generator MG2. This "motive power" refers to mechanical power output from engine 2 and converted by motor generator MG1 into electric power for driving motor generator MG2 from the mechanical power.

The operation of engine 2 is limited when the driver presses an EV (electric vehicle) preference switch 46. The traveling mode of the vehicle is then set at an EV traveling mode of traveling only by means of the driving force of motor generator MG2. The EV traveling mode is suitable for noise reduction in a densely built-up area late at night or early in the morning as well as for exhaust gas reduction in an indoor parking lot or a garage. In contrast, a normal traveling mode of operating the engine will be referred to as an HV (hybrid vehicle) traveling mode.

The EV traveling mode is automatically released upon satisfaction of either one of conditions such as when: 1) EV preference switch 46 is turned off; 2) the value indicating the state of charge SOC of battery becomes lower than a predetermined value; 3) the vehicle speed exceeds a predetermined value (e.g., 55 km/h); and 4) the value indicating the accelerator pedal position exceeds a prescribed value.

Traveling-mode setting unit 64 sets the traveling mode of hybrid vehicle 1 at either one of the EV traveling mode and HV traveling mode based on output signal Acc received from accelerator pedal position sensor 42, vehicle speed V detected by vehicle speed sensor 44 and information received from EV preference switch 46 indicating whether or not the driver has selected the EV traveling mode. This information corresponds to information indicating a "vehicle state of hybrid vehicle 1". Traveling-mode setting unit 64 outputs information on the traveling mode as set to hybrid control unit 62. Based on the information received from traveling-mode setting unit 64, hybrid control unit 62 controls engine 2, and controls inverter 36 to control the operation of motor generator MG2.

In other words, control device 14 is a control device for controlling hybrid vehicle 1 to perform EV traveling in which the wheels are driven by motor generator MG2 with engine 2 stopped, when the vehicle state satisfies a predetermined condition.

Hybrid control unit 62 executes a counting operation of increasing a count at predetermined time intervals (e.g., per second) while engine 2 is stopped. Hybrid control unit 62 can thereby keep track of the engine stop period. The count obtained by this counting operation will hereinafter be referred to as an "engine stop counter value". The engine stop counter value is stored in storage unit 66 in a nonvolatile manner.

Hybrid control unit 62 also receives information from a switch 55 provided for connector 26 indicating that switch 55 is in the on state (or off state). For example, switch 55 is turned on when charging apparatus 25 is connected to connector 26, and is turned off when connection between charging apparatus 25 and connector 26 is interrupted. Hybrid control unit 62 determines that charging of battery B has been started when switch 55 is switched from the off state to the on state.

The technique for detecting whether battery B is being charged is not limited to the above-described one. For instance, hybrid vehicle 1 may be provided with a current sensor for sensing current flowing through a cable which connects connector 26 and battery B, so that hybrid control unit 62 determines that battery B is being charged based on the result sensed by the current sensor (i.e., the fact that current is flowing through the cable).

Figure 3:
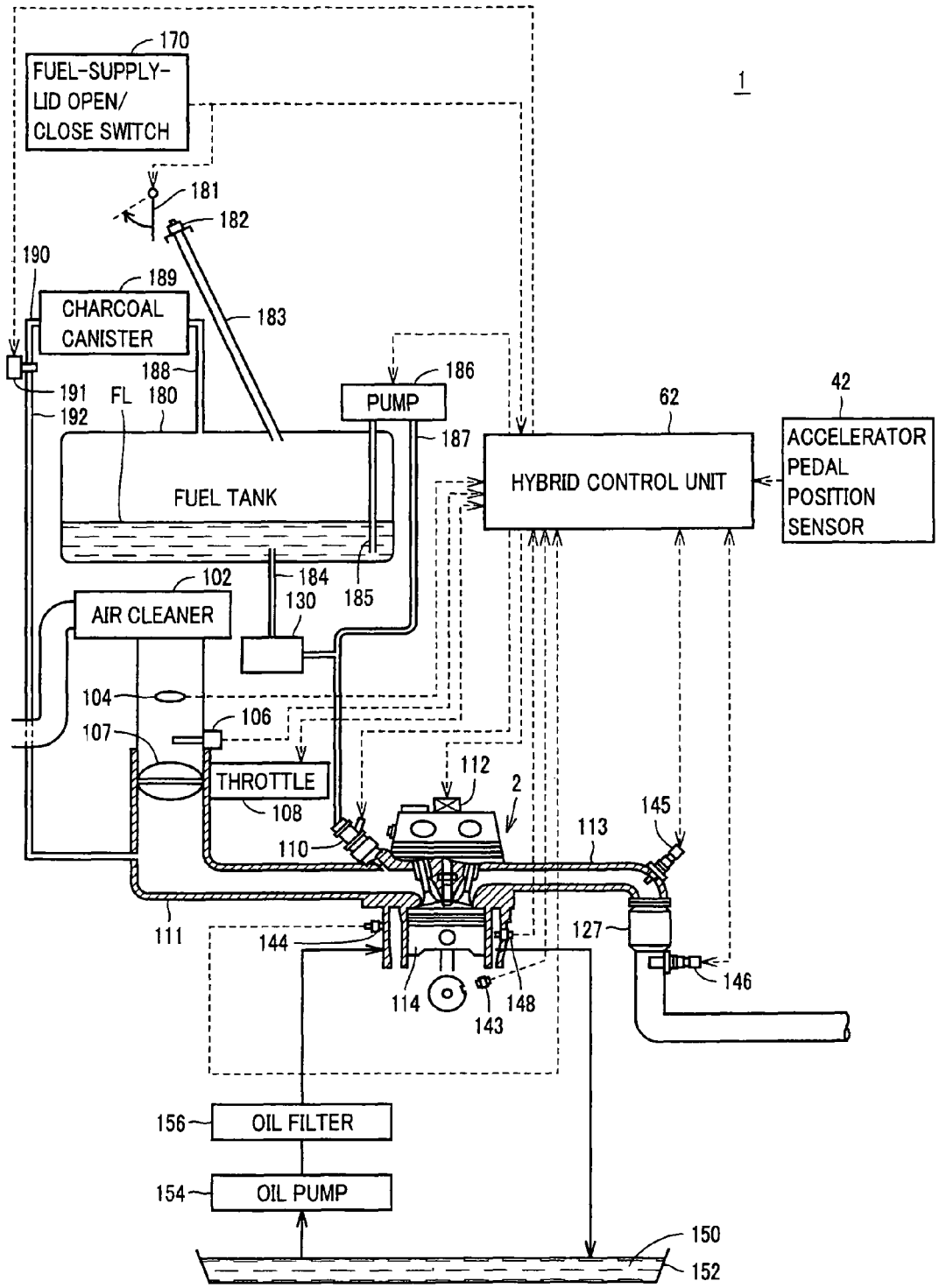
FIG. 3 is a schematic view for describing peripherals of an engine 2.

FIG. 3 is a schematic view for describing peripherals of engine 2. Referring to FIG. 3, hybrid vehicle 1 includes engine 2. Engine 2 includes an intake pipe 111 for introducing intake air through a cylinder head and an exhaust pipe 113 for exhausting air through the cylinder head.

An air cleaner 102, an airflow meter 104, an intake-air temperature sensor 106 and a throttle valve 107 are provided in the cited order from the upstream side of intake pipe 111. The opening position of throttle valve 107 is controlled by an electronic control throttle 108. An injector 110 injecting fuel is provided in the vicinity of an intake valve of intake pipe 111.

An air-fuel ratio sensor 145, a catalytic device 127 and an oxygen sensor 146 are provided in exhaust pipe 113 in the cited order from the exhaust valve side. Engine 2 further includes a piston 114 moving up and down in a cylinder provided in a cylinder block, a crank position sensor 143 sensing the rotation of a crankshaft which rotates according to the up-and-down movement of piston 114, a knock sensor 144 sensing the vibration of the cylinder block to detect the occurrence of knocking, and a coolant-temperature sensor 148 attached to a cooling passage of the cylinder block.

Hybrid vehicle 1 further includes hybrid control unit 62 and accelerator pedal position sensor 42. Hybrid control unit 62 controls electronic control throttle 108 according to an output of accelerator pedal position sensor 42 to vary the amount of intake air, and outputs an ignition instruction to an ignition coil 112 according to a crank angle obtained by a crank position sensor 143 to output fuel injection timing to injector 110. Hybrid control unit 62 also corrects the amount of fuel injection, the amount of air and ignition timing according to outputs of intake-air temperature sensor 106, knock sensor 144, air-fuel ratio sensor 145 and oxygen sensor 146.

Hybrid vehicle 1 further includes a fuel tank 180 holding fuel FL, a pump 186, a pressure regulator 130, a charcoal canister 189, and a canister-purge vacuum switching valve 191.

Pump 186 is an electric pump driven by the electric power of battery B. When battery B is connected to an external power supply, pump 186 can be driven by electric power received from the external power supply via battery B. Hybrid control unit 62 controls the action and stopping of pump 186. Fuel FL pumped up by pump 186 through a pipe 185 is discharged into a pipe 187 under pressure. When injector 110 is opened in predetermined timing, fuel FL is injected into intake pipe 111. When fuel FL is to be circulated, hybrid control unit 62 controls pump 186 to increase the pressure to be applied to fuel FL discharged into pipe 187. Hybrid control unit 62 further controls injector 110 not to inject fuel. Accordingly, fuel FL discharged by pump 186 into pipe 187 is returned to fuel tank 180 via pressure regulator 130 and a pipe 184. Pipe 184 corresponds to a return pipe for returning fuel FL discharged by pump 186 to fuel tank 180.

Fuel vapor evaporated in fuel tank 180 passes through a pipe 188 to be adsorbed by activated charcoal in charcoal canister 189. Then, canister purge VSV (vacuum switching valve) 191 is opened by hybrid control unit 62, so that the adsorbed fuel vapor passes through pipes 190 and 192 to be discharged into intake pipe 111.

When the driver operates a fuel-supply-lid open/close switch 170, a lid 181 is opened. Removing a fuel cap 182, fuel FL is supplied from a fuel supply apparatus such as in a gas station to a fuel supply pipe 183.

Provided under engine 2 is an oil pan 152 holding an engine oil 150 (lubricating oil). Engine oil 150 is pumped up by an oil pump 154. Engine oil 150 pumped up by oil pump 154 passes through an oil filter 156 for adsorbing a foreign matter contained in engine oil 150, to be supplied to the respective components of engine 2. Oil pump 154 may be a pump discharging oil into an oil pipe by means of driving force of engine 2, or may be an electric pump. Oil supplied to the respective components of engine 2 drops down through clearances in engine 2 or flows down along the inner wall of engine 2 to return to oil pan 152. Circulation of engine oil 150 is schematically shown in FIG. 3.

In hybrid vehicle 1 shown in FIG. 1, increasing the capacity of battery B can increase the traveling range of electric vehicle. However, repeating only short-distance traveling of hybrid vehicle 1 makes it more likely that motor generator MG2 alone will be used for driving of the vehicle. That is, the stop period of engine 2 is prolonged, which in turn may increase the stop period of pump 186. The stop period of pump 186 may also be prolonged due to long-period stopping of hybrid vehicle 1 itself.

When the stop period of pump 186 has continued for a long time, rust may be formed in the pipes, for example, due to moisture separated from fuel remaining in the pipes or ion exchange between the inner wall of the pipes and fuel. The rust formed in the pipes may cause the pipes to be cracked and the fuel pipe to be blocked.

Further, changes in fuel properties (e.g., viscosity) may cause failure in appropriate injection of fuel from injector 110. In this case, it is assumed that the starting capability of engine may be deteriorated. To prevent such problems, the technique for returning all fuel in the pipes to the fuel tank can be considered. When the engine has been stopped for a long period of time, however, this technique prolongs the time required to supply fuel to the engine for restarting the engine, which deteriorates the starting capability of engine.

According to the present embodiment, hybrid control unit 62 starts pump 186 to circulate fuel FL when the stop period of pump 186 is a predetermined period or longer. This can avoid separation of moisture from fuel, which can therefore prevent rust from being formed in the pipes. In addition, circulating fuel FL can prevent properties of fuel FL from being changed, as well as allowing pump 186 to be stopped with fuel FL remaining in the pipes. From these reasons, the present embodiment can prevent the starting capability of engine from being deteriorated.

Further, according to the present embodiment, the pump is operated during charging of the hybrid vehicle. When pump 186 is started while the hybrid vehicle is traveling in the EV traveling mode, pump 186 consumes power of battery B. This increases the likelihood that the travel distance of hybrid vehicle in the EV traveling mode will be shortened. To charge battery B, it is conceivable to operate the engine as well as to cause motor generator MG1 to generate power. For the sake of environment, however, it is preferable to keep engine 2 stopped.

In the present embodiment, the pump is started during charging of battery B. Thus, even when power stored in battery B is reduced temporarily, battery B can be charged immediately by an external power supply. The present embodiment can therefore prevent the distance that the hybrid vehicle can travel in the EV traveling mode from being shortened. This allows engine 2 to be kept stopped for a long time, so that an environmentally friendly vehicle can be achieved.

Further, when the fuel pump is started during EV traveling, the user may be conscious of the vibration or noise caused by the action of the pump. This may bother the user. However, the present embodiment can prevent such a problem from occurring by operating the pump when the vehicle is not moving.

Figure 4:
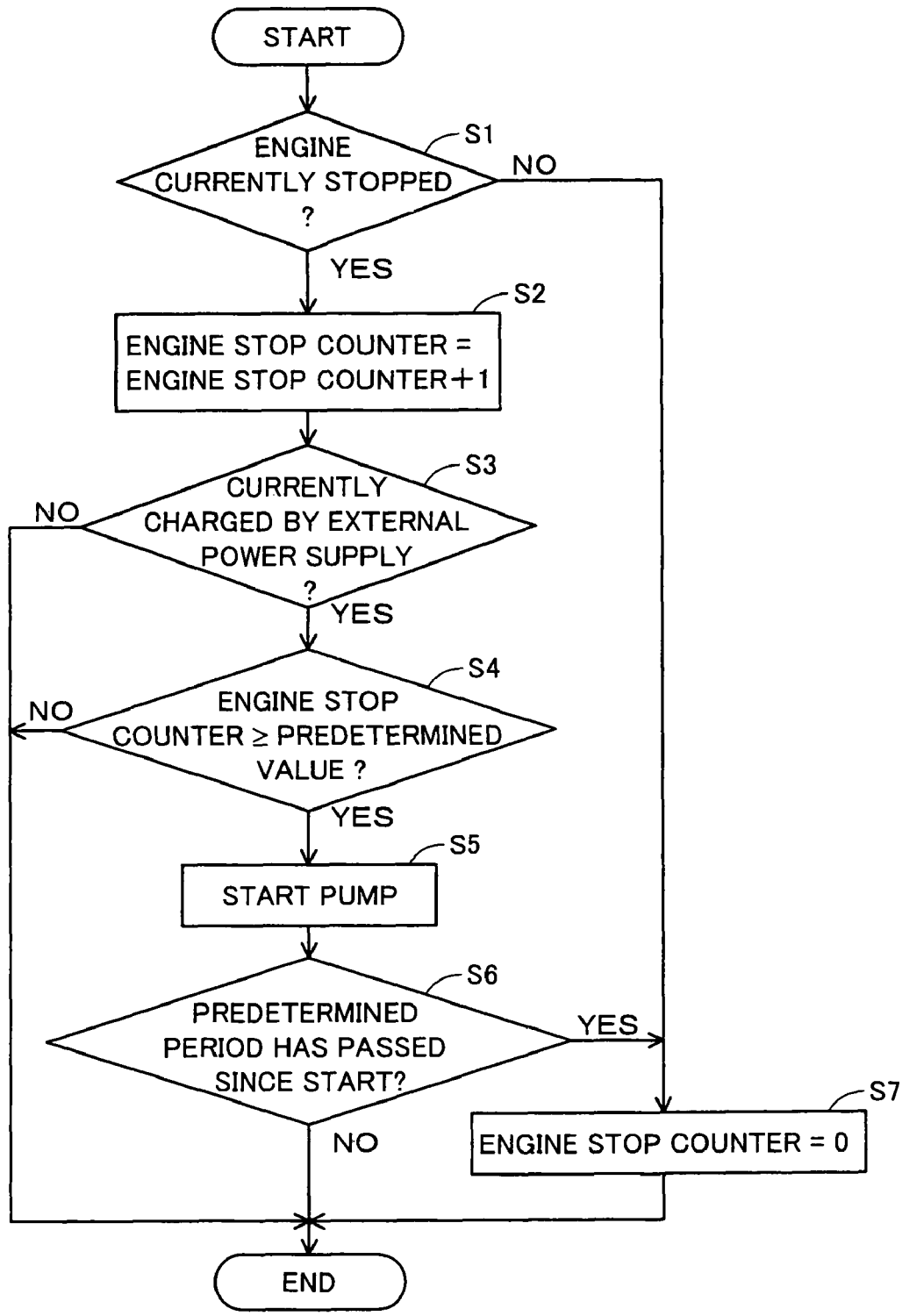
FIG. 4 is a flow chart showing a fuel circulating process according to the embodiment.

FIG. 4 is a flow chart of a fuel circulating process according to the present embodiment. This flow chart represents a subroutine. The process shown in the flow chart is invoked from a main routine to be executed. The process shown in this flow chart is repeated at regular time intervals, by way of example. Alternatively, the process may be started each time the activation of the vehicle is instructed.

Referring to FIGS. 4 and 2, when the process is started, hybrid control unit 62 determines whether or not engine 2 is stopped based on, for example, the engine speed (step S1). When it is determined that engine 2 is not stopped (NO in step S1), hybrid control unit 62 sets the engine stop counter value at an initial value, 0 (step S7). When step S7 is terminated, the entire process is terminated.

When engine 2 is stopped (YES in step S1), hybrid control unit 62 increments the engine stop counter value by one (step S2). When step S2 is terminated, step S3 is executed.

In step S3, hybrid control unit 62 determines whether or not battery B is being charged by an external power supply based on the state of switch 55. When switch 55 is off, hybrid control unit 62 determines that battery B is not being charged. In this case (NO in step S3), the entire process is terminated. On the other hand, when switch 55 is on, hybrid control unit 62 determines that battery B is being charged. In this case (YES in step S3), hybrid control unit 62 executes step S4.

In step S4, hybrid control unit 62 determines whether or not the engine stop counter value is at least a predetermined value. In other words, hybrid control unit 62 determines whether or not the engine stop period is equal to or longer than a predetermined period. When the engine stop counter value is less than the predetermined value (NO in step S4), the entire process is terminated. On the other hand, when the engine stop counter value is at least the predetermined value (YES in step S4), hybrid control unit 62 starts pump 186 (step S5).

Hybrid control unit 62 determines whether or not the predetermined period has passed since pump 186 was started (step S6). This "predetermined period" can be determined appropriately by experiments, for example. When the predetermined period has passed since the start of pump 186 (YES in step S6), hybrid control unit 62 executes step S7. The engine stop counter value is then set at the initial value 0. When the time passed since the start of pump 186 does not reach the predetermined period (NO in step S6), the entire process is terminated.

In this manner, the present embodiment can implement a hybrid vehicle that can reduce influences exerted by fuel upon the vehicle when the engine has been stopped for a long period of time.

In the flow chart of FIG. 4, hybrid control unit 62 employs the engine stop period as the stop period of pump 186. Of course, hybrid control unit 62 may measure the stop period of pump 186 itself. Hybrid control unit 62 may also measure the EV traveling time of hybrid vehicle 1 as the stop period of pump 186. Accordingly, the stop period of pump 186 can be identified without directly detecting whether or not pump 186 is operating, which allows the process executed by hybrid control unit 62 to be simplified.

The present embodiment is based on a series/parallel type hybrid system in which the motive power of the engine can be split by a power split device for transmission to an axle and a generator. However, the present invention can be applied to a series type hybrid vehicle in which the engine is used only for driving the generator and the driving force for the axle is produced only by means of a motor which employs electric power generated by the generator. In the series type hybrid vehicle, the battery alone may not be enough to supply electric power to the motor in the case of driving the motor according to a driving request. In this case, the engine is started to cause the generator to generate power, and the sum of electric power of the battery and electric power generated by the generator is supplied to the motor. The engine is also started when the value indicating the battery SOC is decreased.

Further, the present invention can also be applied to a parallel type hybrid vehicle in which wheels are driven directly by the engine and motor. In the parallel type hybrid vehicle, the motor assists with the motive power of engine as well as serving as a generator for charging the battery. The parallel type hybrid vehicle can travel with the battery being charged by the generator.

The series type hybrid vehicle and parallel type hybrid vehicle both have an operating mode of bringing the engine into an operating state and an operating mode of stopping the engine and bringing the motor into an operating state. Accordingly, the present invention is also applicable to these vehicles.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:

1. A hybrid vehicle comprising:
   a power storage device;
   a connection unit configured to electrically connect said power storage device and an external power supply present external to said hybrid vehicle such that said power storage device is charged by said external power supply;
   a rotating electric machine generating a torque for driving a wheel by electric power received from said power storage device;

an internal combustion engine executing at least one of driving said wheel and supplying motive power to said rotating electric machine;

a fuel tank holding fuel for said internal combustion engine;

a fuel pump discharging said fuel in said fuel tank;

a return pipe for returning said fuel discharged by said fuel pump back to said fuel tank; and a control device driving said fuel pump to circulate said fuel in said fuel tank through said return pipe, when said fuel pump has been stopped for at least a predetermined period and said power storage device is being charged by said external power supply.

2. The hybrid vehicle according to claim 1, wherein said fuel pump is configured to be operated by electric power received from said external power supply via said power storage device.

3. The hybrid vehicle according to claim 2, wherein said control device sets an operating mode of said hybrid vehicle at one of a first mode of operating at least said internal combustion engine and a second mode of stopping said internal combustion engine and operating said rotating electric machine, and measures a traveling time of said hybrid vehicle in said second mode as a stop period of said fuel pump to determine whether or not said fuel pump has been stopped for at least said predetermined period.

* * * * *